Jan. 7, 1936.                E. W. ALLEN                 2,027,262
                            STORAGE BATTERY
                          Filed Sept. 5, 1934
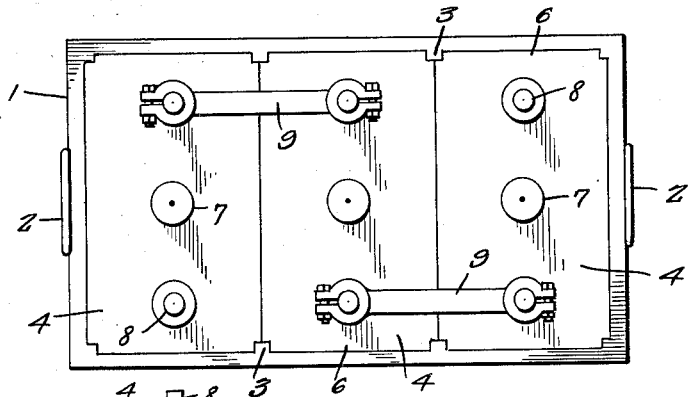
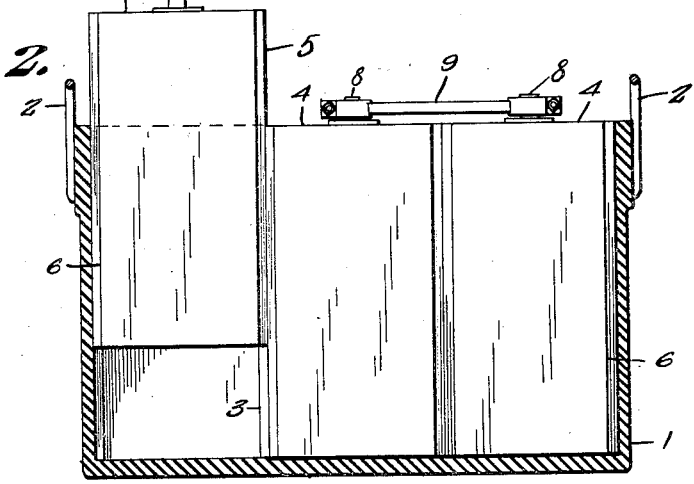
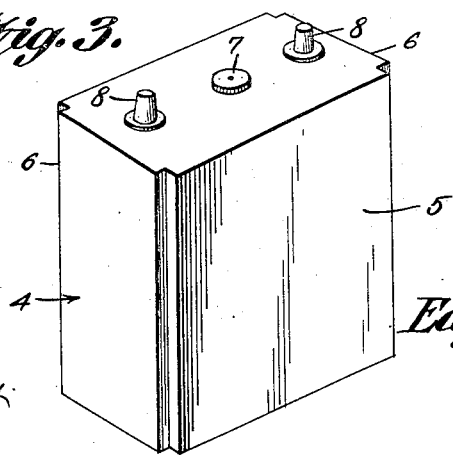
Edgar W. Allen,
INVENTOR Patented Jan. 7, 1936

2,027,262

UNITED STATES PATENT OFFICE 2,027,262

STORAGE BATTERY

Edgar W. Allen, Eldon, Mo.

Application September 5, 1934, Serial No. 742,823

1 Claim. (Cl. 136—166)

This invention relates to storage batteries and has for the primary object the provision of a device of this character wherein each cell is a complete unit in itself removably mounted in a case so that a battery of this character may have any one of its cells removed and replaced by another when such cells become defective or in need of recharging.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a top plan view illustrating a storage battery constructed in accordance with my invention.

Figure 2 is a vertical sectional view illustrating the same.

Figure 3 is a perspective view illustrating one of the cells.

Referring in detail to the drawing, the numeral 1 indicates a main casing provided with handles 2 to facilitate the carrying or handling of the battery. Opposite walls of the casing have formed upon their inner faces relatively spaced vertically arranged ribs 3. Positioned within the casing 1 are cells 4 each forming a complete unit in itself, that is, each cell is of the conventional construction as to the plates and separators and such parts are confined within a casing 5, the corners of which are cut away to form at the ends of the casing 5 projections 6 slidably received by the guides or ribs 3. The casing 5 is completely closed except for the usual filling plug 7 and the poles 8 of the cells are of the conventional type and said cells are electrically connected by removable connectors 9 engageable with the poles 8. Thus it will be seen that any one of the cells 4 may be readily removed from the casing 1 when found to be defective or in need of recharging by simply removing the connector.

Batteries constructed in accordance with the foregoing will permit dealers or other battery representatives to maintain in stock cells and when a battery is found to have a defective cell such cell can be easily removed and replaced by a new one, consequently eliminating the necessity of removing the entire battery from its support or taking such battery out of use. This will provide a large saving in time to the reconditioning of batteries and at a much lower cost to the battery owner.

Having described the invention, I claim:

A storage battery comprising a main casing, handles for said casing, ribs formed on opposite walls of the casing to form guides, cells arranged in the casing and each comprising a complete unit in itself and including an auxiliary casing having its corners cut away to form end projections received by said guides and thereby removably mounted to said main casing and normally held against relative movement to one another and the main casing, and connectors detachably and electrically connecting the cells.

EDGAR W. ALLEN.